Patented Dec. 5, 1933

1,938,360

UNITED STATES PATENT OFFICE 1,938,360

MANUFACTURE OF ALKYL ETHERS OF CELLULOSE

David Traill, Saltcoats, Scotland, assignor to Imperial Chemical Industries Limited, London, England, a corporation of Great Britain No Drawing. Application July 2, 1930
Serial No. 465,453

6 Claims. (Cl. 260—152)

This invention relates to the manufacture of alkyl ethers of cellulose.

So far as I am aware the methods hitherto employed for producing a range of cellulose ethers which have individually the viscosity characteristics appropriate to the particular application intended, have necessitated an after-treatment of an ether of higher viscosity in presence of a swelling agent or solvent and a degrading substance; in short by an additional process involving expense. While it is known that by varying the relative proportions of cellulose, water and caustic soda in the mixture which is etherified the viscosity of the cellulose ether is greatly altered, but it is almost impracticable to obtain by such variation of composition a considerable variation in the viscosity of the cellulose ether without at the same time considerably altering its solubility and mechanical properties and sometimes also its degree of alkylation. Indeed except for a certain very restricted range of compositions of reaction mixtures, resulting in a similarly restricted range of ethers, every time a cellulose ether of a new viscosity is desired a new series of long researches has to be undertaken in order to find conditions that result in an ether of the desired combination of properties.

This invention has as an object the provision of an improved process for producing alkyl or aralkyl ethers of cellulose of predetermined viscosity characteristics which may be varied as desired.

The invention consists in a process for the manufacture of cellulose ethers in which soda cellulose is prepared by mercerizing cellulose in caustic soda of between about 18 and 20% concentration and is pressed to two to four times the weight of cellulose raw material, is matured by storing at a temperature within the range from about −10° C. to about 50° C. but preferably at a temperature between about 20° C. and about 30° C. for a length of time depending on the temperature and the desired product, for instance, from about 12 hours to about 90 hours, but for longer or shorter times according to the temperature employed and according to the product desired, the matured soda cellulose then being treated with at least 50 parts of caustic soda per 100 parts of cellulose it being thereafter treated with an alkyl or aralkyl halide for example an alkyl chloride such as methyl chloride or ethyl chloride.

The invention also consists in a process of manufacturing cellulose alkyl or aralkyl ethers soluble in ethylene-chlorhydrin or a mixture of alcohol and benzene, or both, by first mercerizing a suitable form of cellulose in a caustic soda solution of a concentration between about 18% and about 20%, then pressing to a weight between 200 and 400 parts per 100 parts cellulose raw material used, comminuting the soda cellulose thus produced, maturing it at a temperature between −10° C. and 50° C., and preferably between 20° C. and 30° C., for a length of time which is varied according to the temperature employed within the permitted limits and the viscosity desired for the product, and then adding not less than 50 parts of solid caustic alkali per 100 parts cellulose raw materials used, and then alkylating it with an alkyl chloride or aralkylating it with an aralkyl chloride, optionally with further addition or additions of solid caustic soda made either before or after or in alternate portions with the alkyl chloride.

The invention also consists in a process for the production of alkyl or aralkyl cellulose of definite solubility by a combination of specified conditions of mercerizing, pressing, maturing, addition of solid caustic soda and then alkylating or aralkylating, the maturing temperatures being then the range indicated herein.

The invention also consists in processes for the manufacture of cellulose ethers substantially as herein described and in products which may be made by those processes or by the obvious chemical equivalents of those processes.

The following examples illustrate how the invention may be carried into effect, reference to parts and to percentages being to parts and percentages by weight, the first example being a general example:—

Example 1

The first stage in the process is the mercerization of the cellulose with caustic soda solution. One hundred parts of wood pulp, cotton pulp, or other form of cellulose, preferably in the form of large sheets, are immersed in a bath of aqueous caustic soda of concentration between about 18 and 20% at normal or room temperature for at least one hour, and are then pressed to remove excess of caustic soda so that the cellulose with the caustic contained therein after pressing has a weight that is between 2 and 3 times the weight of cellulose raw material. The pressing may be carried out in a hydraulic press such as is used in the viscose silk industry. The mercerized cellulose is next shredded into a fine crumb-like state, this operation being conveniently performed in a Werner-Pfleiderer machine with dentated sigma blades. The soda cellulose is now stored in a room at a temperature of —10 to 50° C. but preferably at a temperature between 20–30° C. for a certain length of time. The temperature and the duration of this stage of the manufacture which may be referred to as the "maturing" of the soda cellulose, depend on the type of ether which is desired. It has been shown by various workers that soda cellulose undergoes oxidation during this maturing process, and that a molecular rearrangement or disaggregation is rendered possible by this absorption of oxygen. The extent of such molecular change is dependent, to some extent on the conditions of the maturing of the soda cellulose. This maturing process should be carried out in order to obtain an alkyl cellulose of good quality, and with the conditions of maturing the viscosity of the product will be changed. Thus to produce an ether which will be particularly suitable for the manufacture of artificial silk, it is necessary to mature the soda cellulose for 70–90 hours, at 25° C. or for a longer time at a lower temperature.

With shorter maturing, say 12 to 24 hours, at 20°–25° C. ethers with viscosities in the region of 2000 c. g. s. in a 10% solution of 80:20 toluene-alcohol, can be produced. An ether suitable for molding powders and thermoplastic compositions may be made by still further curtailing the maturing period of the soda cellulose, say, 6 to 12 hours, at 25° C., or by increasing or reducing the period at lower or higher temperatures, respectively.

Thus a soda cellulose may be kept for several days and the maturing process retarded, by storing it at a temperature below 0° C.

Further changes in the properties of cellulose ethers may be effected by the addition to the soda cellulose while it is maturing of oxidizing agents such as sodium peroxide, ferric hydroxide or the like, or of reducing agents such as sulfites, or by excluding oxygen.

The matured soda cellulose is next placed in an autoclave, fitted with efficient stirring gear and a quantity of powdered caustic soda not less than 50 parts is added and intimately mixed with the soda cellulose. An alkyl chloride, such as ethyl chloride or methyl chloride or an aralkyl chloride, such as benzyl chloride, is added, the most convenient method being to pump it in and the mixture is heated at 90–110° C. Lower temperatures may be employed if a less alkylated or aralkylated product is required. As the reaction takes place, and the alkyl or aralkyl chloride is used up, there is a consequent fall in the pressure. More chloride is added as required. The heating is continued for 4–24 hours or longer if desired. More powdered caustic soda may be added at intervals according to the viscosity and solubility of the ether required. The excess of alkyl or aralkyl chloride may be recovered by driving it out of the autoclave through a suitably cooled condenser, and collecting the liquid. The reaction product is easily purified—generally by washing with water until free from sodium chloride and drying. In the case of certain methyl celluloses, which are soluble in water, the purification must be suitably modified. The product is obtained in a white granular condition or in the form of hard fibres. Ethyl cellulose manufactured in this way is soluble in various organic solvents—alcohol, benzene-alcohol or toluene-alcohol mixtures, benzene, ethylene chlorhydrin or the like.

*Example 2*

According to this example 100 parts of wood pulp, cotton pulp or other form of cellulose preferably in the form of large sheets are immersed in a bath of aqueous caustic soda of concentration between about 18 and 20% at normal temperatures for any suitable time up to 24 hours. The cellulose is then pressed to 200 to 400 parts by weight. After being finely shredded in a Werner-Pfleiderer machine with dentated sigma blades or some such suitable machine the soda cellulose is matured for three days at about 25° C. The soda cellulose is then thoroughly mixed with about 75 parts of finely powdered caustic soda and about 300 parts of ethyl chloride are added, the whole thoroughly mixed in the autoclave which is heated to between 90 and 110° C. After 8 hours a further addition of 75 parts caustic soda and about 300 parts of ethyl chloride is made and the mixture is again heated at 90–110° C. for 8 hours, stirring continuously. A third addition of similar quantities of ethyl chloride and caustic soda may be added and heating continued for a further 8 hours. The excess of ethyl chloride after each interval of heating is collected, then at the end of the process, the reaction product is washed free from chloride, and, if alkaline, neutralized. When dry it is in a hard and somewhat granular condition. It is readily soluble in alcohol, mixtures of benzene or toluene and alcohol, ethylene chlorhydrin, etc. An ethyl cellulose made in this way gives, in 10% solutions in benzene or toluene-alcohol mixture (80:20 by volume), a viscosity of 15–50 c. g. s. and is suitable for the manufacture of artificial silk as well as having other technical applications.

*Example 3*

According to this example 100 parts of wood pulp, cotton pulp or other form of cellulose preferably in the form of large sheets are immersed in a bath of aqueous caustic soda of concentration between about 18 and 20% at normal temperature for at least one hour, and pressed and shredded as described in Example 2. The soda cellulose is matured for 12 hours at 25° C. and then treated in an autoclave with caustic soda and ethyl chloride exactly as in Example 2. The product in this case does not possess the same solubility as an ethyl cellulose produced as described in Example 2, but is soluble in ethylene chlorhydrin and is suitable for molding powders and thermoplastic compositions, giving products of high tensile strength.

*Example 4*

According to this example, 100 parts of wood pulp, cotton pulp or other form of cellulose preferably in the form of large sheets are mercerized, pressed and shredded as described in Example 2. The soda cellulose is matured for 3 days at 25° C. and then mixed with 50–100 parts of powdered caustic soda in an enamel lined autoclave. Methyl chloride is pumped in until a pressure of 200 lbs. per square inch is registered. The autoclave is heated to 90–110° C., the mixture being stirred continuously. More methyl chloride is pumped in to maintain the pressure at 200 lbs. per square inch approximately. After 8 hours heating is discontinued and excess methyl chloride recovered. Another addition of 50–100 parts of caustic soda is made, and heating and stirring are continued. Methyl chloride is pumped in and the pressure maintained at about 200 lbs. per square inch. After 8 hours heating the operation of adding more caustic soda and methyl chloride is repeated. A dimethyl cellulose is produced in this way.

The invention is not limited to any maximum addition of caustic soda, at least 50 parts of solid caustic soda per 100 parts of cellulose should be added to the matured and shredded soda cellulose but further solid caustic soda may be added before, after or alternating with the alkali halide.

The soda celluloses referred to above are not dried and as the following table shows maturing does not result in drying.

Pressing to 250 parts per 100 parts cellulose raw material:

|  | Before maturing | After maturing 3 days at 25° |
|---|---|---|
| Cellulose | 36.17% | 35.80% |
| Sodium hydroxide | 11.99 | 11.37 |
| Sodium carbonate | 1.39 | 1.91 |
| Water | 50.54 | 50.92 |

Cellulose ethers prepared as described above are characterized by their solubility in ethylenechlorhydrin or mixtures of alcohol and benzene or both and are distinguished from alkylated or aralkylated cellulose derivatives which are at the same time soluble in aqueous alkalies and insoluble in organic solvents and water.

The invention is not limited to the examples given above but the processes described may be varied in such ways as to give products differing in viscosity and solubility, for instance, to suit the requirements of the particular technical application for which the ether is to be employed.

In this way it is possible to produce cellulose ethers which are suited for different technical applications among which are enamels, wood finishes, brushing and spraying lacquers, protective coatings, artificial silk, gramophone records, molding powders, insulating materials, and celluloid.

The method of manufacture is specially suitable for a process which starts with wood pulp as its raw material, but any form of cellulose or cellulose hydrate, such as cotton cellulose, paper, waste from viscose artificial silk manufacture, regenerated cellulose or the like may be employed.

The present invention represents an advance in the art because by means of it it is possible when using fixed arbitrary values within the stated limits, where limits are given, for the mercerizing concentration, pressing, and weights of added solid caustic soda and alkyl or aralkyl chloride and etherification temperature, to obtain a range of cellulose ethers that differ very widely in viscosity characteristics, but that have approximately the same chemical and mechanical properties; that is to say, I find it practicable to obtain the desired variations in viscosity over a wide range by altering my manufacture only in respect of maturing conditions. The solubility characteristics of the ethers, however, are liable to some variation when the time of maturing is very short and the viscosity consequently very high, but the ethers are soluble in one or other of a number of organic solvents.

As many apparently widely different embodiments of this invention may be made without departing from the spirit and scope thereof, it is to be understood that I do not limit myself to the specific embodiments thereof except as defined in the appended claims.

I claim:

1. A process of manufacturing cellulose ether which comprises mercerizing cellulose in caustic alkali of about 18-20% concentration expressed in terms of sodium hydroxide, pressing the cellulose to 2 to 4 times the weight of the raw material, maturing the cellulose by storing at a temperature within the range of about −10° C. to about 50° C., regulating the time of storing for the temperature selected within said range in accordance with the viscosity characteristics desired in the cellulose ether, treating the matured alkali cellulose so produced with at least 50 parts of caustic alkali expressed in terms of sodium hydroxide per 100 parts of cellulose mixed therewith, and then treating the mixture of alkali and alkali cellulose with an organic halide from the group consisting of alkyl halides and aralkyl halides.

2. A process of manufacturing cellulose ether which comprises mercerizing cellulose in caustic soda of about 18-20% concentration, pressing the cellulose to 2 to 4 times the weight of the raw material, maturing the cellulose by storing at a temperature within the range of about 20° C. to about 30° C., regulating the time of storing for the temperature selected within said range in accordance with the viscosity characteristics desired in the cellulose ether, treating the matured soda cellulose so produced with at least 50 parts of caustic soda per 100 parts of cellulose mixed therewith, and then treating the mixture of soda and soda cellulose with an organic halide from the group consisting of alkyl halides and aralkyl halides.

3. A process of manufacturing cellulose ethers soluble in ethylene chlorhydrin or in a mixture of alcohol and benzene, or both, which comprises mercerizing cellulose in caustic alkali of about 18-20% concentration expressed in terms of sodium hydroxide, pressing the cellulose to 2 to 4 times the weight of the raw material, maturing the cellulose by storing at a temperature within the range of about −10° C. to about 50° C., regulating the time of storing for the temperature selected within said range in accordance with the viscosity characteristics desired in the cellulose ether, treating the matured alkali cellulose so produced with at least 50 parts of caustic alkali expressed in terms of sodium hydroxide per 100 parts of cellulose mixed therewith, and heating the mixture of alkali and alkali cellulose with an organic halide from the group consisting of alkyl halides and aralkyl halides within a temperature range of about 90° C. to about 110° C.

4. A process of manufacturing cellulose ethers soluble in ethylene chlorhydrin or in a mixture of alcohol and benzene, or both, which comprises mercerizing cellulose in caustic alkali of about 18-20% concentration expressed in terms of sodium hydroxide, pressing the cellulose to 2 to 4 times the weight of the raw material, maturing the cellulose by storing at a temperature within the range of about −10° C. to about 50° C., regulating the time of storing for the temperature selected within said range in accordance with the viscosity characteristics desired in the cellulose ether, treating the matured alkali cellulose so produced with at least 50 parts of caustic alkali expressed in terms of sodium hydroxide per 100 parts of cellulose mixed therewith, heating the mixture of alkali and alkali cellulose with an organic halide from the group consisting of alkyl halides and aralkyl halides within a temperature range of about 90° C. to 110° C., and adding additional caustic alkali and organic halide with further heating.

5. A process of manufacturing cellulose ether which comprises mercerizing cellulose in caustic alkali of about 18-20% concentration expressed in terms of sodium hydroxide, pressing the cellulose to 2 to 4 times the weight of the raw material, maturing the cellulose by storing at a temperature within the range of about —10° C. to about 50° C., regulating the time of storing for the temperature selected within said range in accordance with the viscosity characteristics desired in the cellulose ether, treating the matured alkali cellulose so produced with at least 50 parts of caustic alkali expressed in terms of sodium hydroxide per 100 parts of cellulose mixed therewith, and then treating the mixture of alkali and alkali cellulose with an ethyl halide.

6. A process of manufacturing cellulose ether which comprises mercerizing cellulose in caustic alkali of about 18-20% concentration expressed in terms of sodium hydroxide, pressing the cellulose to 2 to 4 times the weight of the raw material, maturing the cellulose by storing at a temperature within the range of about —10° C. to about 50° C., regulating the time of storing for the temperature selected within said range in accordance with the viscosity characteristics desired in the cellulose ether, treating the matured alkali cellulose so produced with at least 50 parts of caustic alkali expressed in terms of sodium hydroxide per 100 parts of cellulose mixed therewith, and then treating the mixture of alkali and alkali cellulose with a benzyl halide.

DAVID TRAILL.